(No Model.)
M. LEHRFELD.
BRACELET.
No. 249,375.　　　　　　　　　　Patented Nov. 8, 1881.
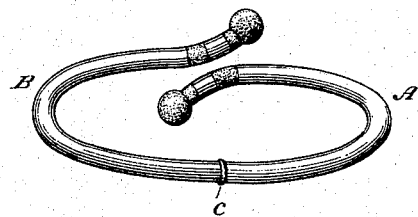
Fig. 1.
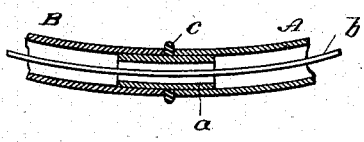
Fig. 2.
Fig. 3.
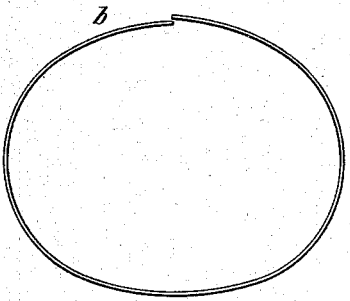
Fig. 4.
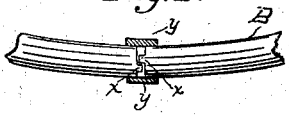
Attest:
R. H. Barnes.
S. W. Luly
Inventor:
Max Lehrfeld
by Elvis Spear
Atty.

UNITED STATES PATENT OFFICE.

MAX LEHRFELD, OF PROVIDENCE, RHODE ISLAND, ASSIGNOR TO SAMUEL E. FISHER, EDWIN D. STURTEVANT, AND WILLIAM W. FISHER, ALL OF ATTLEBOROUGH, MASSACHUSETTS.

BRACELET.

SPECIFICATION forming part of Letters Patent No. 249,375, dated November 8, 1881.

Application filed July 16, 1881. (No model.)

*To all whom it may concern:*

Be it known that I, MAX LEHRFELD, of Providence, in the county of Providence and State of Rhode Island, have invented a new and useful Improvement in Bracelets; and I do hereby declare that the following is a full, clear, and exact description of the same.

My invention relates to two-part bracelets of that class which are held together by a spring acting to close the wings by side movement, the wings being hinged to open sidewise.

The object of the invention is to simplify and cheapen the construction, rendering it at the same time secure and not liable to get out of order.

The special construction in which the invention consists is hereinafter described and claimed.

In the accompanying drawings, Figure 1 represents a perspective view of the bracelet partly open. Fig. 2 is a longitudinal section of the joint. Fig. 3 shows the spring detached. Fig. 4 shows a modification of the joint.

The bracelet is formed of two parts, A and B, exactly alike, except that the part A is formed with one end slightly reduced by means of a small piece of tubing inserted in the said part. This small piece of tubing $a$ is designed to enter the adjoining end of the other part, B, fitting therein closely. This construction forms the hinge upon which the two parts turn.

The spring $b$ is composed of any suitable material, and is inserted within the tubular parts A B, extending preferably the entire length, and being soldered at the free ends. It acts, therefore, by torsion to close the parts, being soldered when the parts are in a closed position, and also by reason of this construction to hold the parts together longitudinally. The bracelet may be made of these three parts, and no others, forming a simple, cheap, and secure bracelet, its torsion-spring holding the parts together in both directions. I, however, prefer to add a small washer, $c$, to take up the play between the parts. One or two turns may be given to the spring, either before or after it is soldered, in order to make it work well.

The tubular parts A and B may be made of any suitable material, and the ends may be ornamented according to fancy.

It will be understood that in this class of bracelets the ends ordinarily overlap.

I am aware that two-part bracelets hinged to open sidewise from the plane of the bracelet are not new, and that it is not new to make a self opening or closing bracelet with a spring running lengthwise through the tubular parts of the bracelet when the bracelet is provided with a hinge and opens by movement in its plane.

In some cases it may be desirable to limit the side movement of the wings. This can be accomplished by forming teeth on the ends of the tubular parts, adapted to interlock with each other like clutches, but having the spaces between the teeth cut away sufficiently to allow the proper amount of side movement, the teeth indicated at $x$ $x$ affording the proper stop. A small band, $y$, is placed over this, soldered upon one part, so as to conceal the joint.

What I claim is—

In a two-part bracelet adapted to turn sidewise to open, and provided with a spring, the interlocking teeth $x$ $x$ and band $y$, the parts being combined and operating as set forth.

In testimony whereof I have signed my name to this specification in the presence of two subscribing witnesses.

MAX LEHRFELD.

Witnesses:
J. E. POND, Jr.,
S. E. FISHER.